United States Patent [19]

Swanberg

[11] Patent Number: 5,196,949
[45] Date of Patent: Mar. 23, 1993

[54] VESTIGIAL SIDEBAND SCOPHONY IMAGING MODULATOR

[75] Inventor: Melvin E. Swanberg, Claremont, Calif.

[73] Assignee: Xerox Corporation, Stamford, Conn.

[21] Appl. No.: 597,921

[22] Filed: Oct. 10, 1990

[51] Int. Cl.$^5$ ............................................. H04N 5/455
[52] U.S. Cl. ................................................... 358/469
[58] Field of Search ..................... 380/10–11, 380/13, 15; 358/11–12, 140, 16, 469

[56] References Cited

U.S. PATENT DOCUMENTS

| | | | |
|---|---|---|---|
| 4,170,028 | 10/1979 | DeBenedictis et al. | 358/285 |
| 4,205,348 | 5/1980 | DeBenedictis et al. | 358/285 |
| 4,213,158 | 7/1980 | DeBenedictis | 358/296 |
| 4,253,725 | 3/1981 | Johnson | 350/6.91 |
| 4,281,904 | 8/1981 | Sprague et al. | 350/356 |
| 4,357,627 | 11/1982 | Johnson | 358/348 |
| 4,635,000 | 1/1987 | Swanberg | 331/10 |
| 4,639,073 | 1/1987 | Yip et al. | 350/6.8 |
| 4,663,523 | 5/1987 | Swanberg | 250/235 |
| 4,694,156 | 9/1987 | Swanberg | 250/214 RC |
| 4,814,636 | 3/1989 | Swanberg | 307/865 |
| 4,918,532 | 4/1990 | O'Connor | 380/10 |
| 5,073,930 | 12/1991 | Green et al. | 358/188 |

OTHER PUBLICATIONS

D. M. Robinson, "Supersonic Light Control & Its Application to Television with Special Reference . . . ", Aug. 1939, pp. 483–486.

John C. Urbach, et al., "Laser Scanning for Electronic Printing", Jun. 1982, pp. 597–618.

Richard V. Johnson, et al., "Scophony Spatial Light Modulator", Jan./Feb. 1985.

Primary Examiner—Stephen Brinich
Attorney, Agent, or Firm—Anglin & Giaccherini

[57] ABSTRACT

A swept frequency modulator for use in a "Scophony" raster output scanner is disclosed. Input video [136] is mixed with a fixed RF frequency [137] provided by a fixed frequency oscillator [138], in a first mixer [139]. The resulting amplitude modulated RF [140] is fed into a vestigial sideband filter [142], producing a vestigial sideband signal [144], which is in turn fed into a second mixer [148], where it is mixed with a swept RF frequency [147]. The output of the second mixer [148] is swept frequency vestigial sideband RF [150], which is input to a driver [152]. The driver [152] drives an acoustooptic modulator [154], which modulates optical beam [156] to produce a modulated, facet-tracking beam [158]. The modulated optical beam [158] tracks a facet of a rotating mirror array which scans it across the photoreceptor. The invention enables achievement of all the potential advantages of a Scophony raster output flying spot scanner: (a) high image resolution, (b) improved depth of focus, and (c) linear system response.

8 Claims, 7 Drawing Sheets

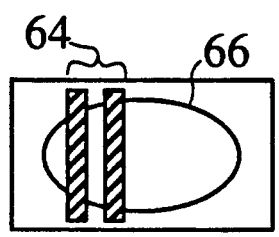 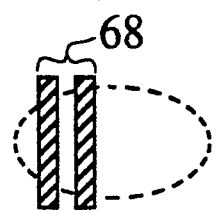 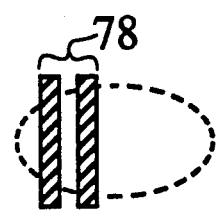
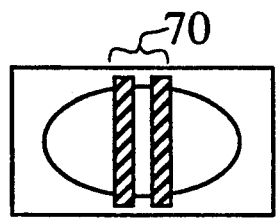 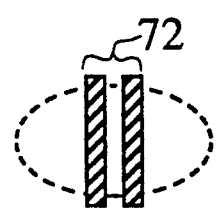 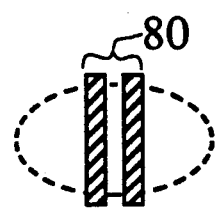
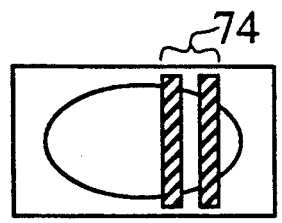 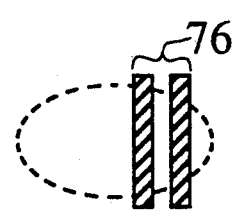 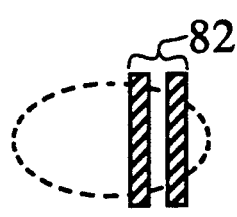
Fig. 4a        Fig. 4b        Fig. 4c

VESTIGIAL SIDEBAND SCOPHONY IMAGING MODULATOR

BACKGROUND OF THE INVENTION

The present invention relates to Scophony raster output scanners (ROS) used for electronic image transmission and processing, such as laser printers and facsimile machines. A Scophony raster output scanner is a particular type of raster output scanner; and a flying spot scanner is also a particular type of raster output scanner.

A flying spot scanner (FSS) may be configured as an input scanner, as an output scanner, or as both. An input scanner scans an optical beam across an existing image or object, in order to form an "electronic image" which can be transmitted and/or processed. An output scanner scans a photoreceptor, in order to form an image on the photoreceptor. The present invention is concerned with output scanners, in particular with "raster output scanners" (ROS), which form an output image while scanning the photoreceptor in a predetermined pattern, or "raster".

In an ROS, a modulated optical beam is raster-scanned across a photoreceptor, in order to recreate, or form, an image. The raster pattern is usually a rectilinear scan, similar to that used on broadcast television, comprising a rapid horizontal line scan, and a relatively slow vertical motion. The rapid horizontal scan is usually provided by a rotating wheel having a number of flat mirror facets on its periphery. The slower vertical scan is usually provided by vertical motion of the photoreceptor. The architecture of a typical ROS is shown in FIG. 1, and in particular the architecture of a Scophony ROS is as described in "Scophony Spatial Light Modulator" in Optical Engineering (24:1) Jan/Feb 1985, pp. 93–100.

When a conventional flying spot scanner (FSS) is used as an ROS, as shown in FIG. 1, an optical modulator provides temporal modulation of the optical beam—i.e. the intensity of the entire optical beam is controlled. The modulator is typically an acousto-optical modulator (AOM). In this "conventional" approach, the optical beam impinging on the AOM must be no larger than the smallest modulatable area in the AOM as shown schematically in FIG. 2a and as detailed in FIG. 3a.

The "Scophony" raster output scanner (Scophony ROS), based on the AOM's spatial modulation capability, impinges a broad optical beam, shown as solid lines in FIG. 2b, on the AOM. The broad optical beam is "spatially" modulated; i.e. it is simultaneously modulated by several elements of the AOM, as shown in FIG. 2b and FIG. 3b. As shown in FIG. 2b, the AOM (object plane) is located at one image conjugate of the scanner optics; and the photoreceptor (image plane) is located at the other image conjugate.

FIG. 3 details the difference between the conventional FSS ROS and the Scophony ROS. FIG. 3a shows how the small laser spot of the conventional FSS ROS is modulated by one small area of the AOM. FIG. 3b shows how the broad laser beam of the Scophony type ROS is modulated by a large area of the AOM, an area which encompasses several signal pulses simultaneously.

The beam-modulating acoustic pulses in the AOM move at the speed of sound in the AOM material. Thus the image of the AOM's signals, formed on the optical detectors, would move rapidly across the photoreceptor. If not compensated for, this rapid motion would cause the image to be so blurred as to be useless. Since the beam is being rapidly scanned across the photodetector in a direction and speed that satisfies other system requirements, the Scophony optical system is designed so that the velocity of the image of the AOM's signals is equal to the beam scan velocity. Thus the image of the pulse train is stationary on the photoreceptor. As shown in FIG. 4c, when the mirror is rotating at the proper velocity, the pulses appear stationary, but the laser beam moves across the photoreceptor.

Because it can make maximum use of mirror facets which are tailored to the overall system bandwidth, the Scophony ROS using vestigial sideband modulation can provide higher resolution for a given size of mirror facet than it can when using the more conventional double sideband (DSB) modulation.

In addition to this advantage, the Scophony ROS using vestigial sideband modulation provides an increased depth of field, relative to an ROS using double sideband (DSB) modulation. Increased depth of field, in turn, makes system focus requirements less critical, thereby making it easier and less expensive to implement.

Finally, the Scophony ROS using vestigial sideband modulation provides an overall linear transfer function, because photoreceptors have a square law response to light amplitude, which is a requirement for a linear detection of vestigial signals. This means that, when used to transfer imagery characterized by shades of gray, rather than just black and white, the Scophony ROS can provide accurate rendition of imagery.

The problem of achieving all the performance improvements inherent in the Scophony raster output scanner (ROS) has presented a major challenge to designers in the ROS field. The development of a practical means of modulating an optical carrier with video information, while simultaneously providing a changing frequency correction to compensate for the motion of the ROS's mirror facet, would enable realization of all the inherent performance improvements. An invention which would enable achievement of this enhanced performance would satisfy a long felt need within the ROS community.

SUMMARY OF THE INVENTION

The present invention solves the problem of efficiently modulating video information onto an optical carrier, while tracking motion of the scan mirror facets. Facet tracking is achieved by sweeping the modulating RF frequency. Simultaneous video motion and facet tracking enable realization of the full potential of raster output scanners (ROS) using the Scophony principle, in such applications as high performance laser printers. The subject invention makes full use of the advantages of the Scophony concept by: (1) modulating the video information onto an RF carrier, (2) filtering the modulated RF to produce a vestigial sideband modulated RF, and (3) sweeping the RF frequency for facet tracking. The vestigial sideband modulated RF is mixed with a swept frequency RF carrier, whose frequency is swept in synchronism with the motion of the ROS's scanning mirror. When modulated onto an optical carrier, the modulated swept RF enables the optical beam to track the motion of individual mirror facets.

FIG. 8b shows how the input video is first mixed with an RF carrier of fixed frequency. The resulting modulated RF is passed through a vestigial sideband filter where one sideband is removed, and the carrier is suppressed to one half amplitude, resulting in vestigial sideband RF. This vestigial sideband RF is then passed into a second mixer, where it is mixed with a swept-frequency RF signal, which is being swept in synchronism with the mirror facet's motion. The second mixer's output, which is a swept frequency RF modulated with the video information, serves as input to a driver. This driver drives an acousto-optical modulator which modulates the optical laser beam. Because of the swept RF modulation, deflection of the optical beam varies with RF frequency. The optical beam thereby tracks a facet of the scanning mirror.

An appreciation of other aims and objectives of the present invention and a more complete and comprehensive understanding of this invention may be achieved by studying the following description of a preferred embodiment and by referring to the accompanying drawings.

BRIEF DESCRIPTION OF THE DRAWINGS

FIG. 2a is a block diagram of the optical layout of a conventional ROS, and FIG. 2b is a block diagram of the optical layout of a Scophony scanner.

FIG. 4 shows how the optical beam stands still, while the pulses move, when no scanning correction is provided by the scanning mirror, and how the beam moves, while the pulses stand still, when a scanning correction is provided by the scanning mirror.

FIG. 5a is an initial position of the rotating mirror. FIGS. 5b and 5c are successive positions during rotation.

DETAILED DESCRIPTION OF THE PREFERRED EMBODIMENT

Figure 1:
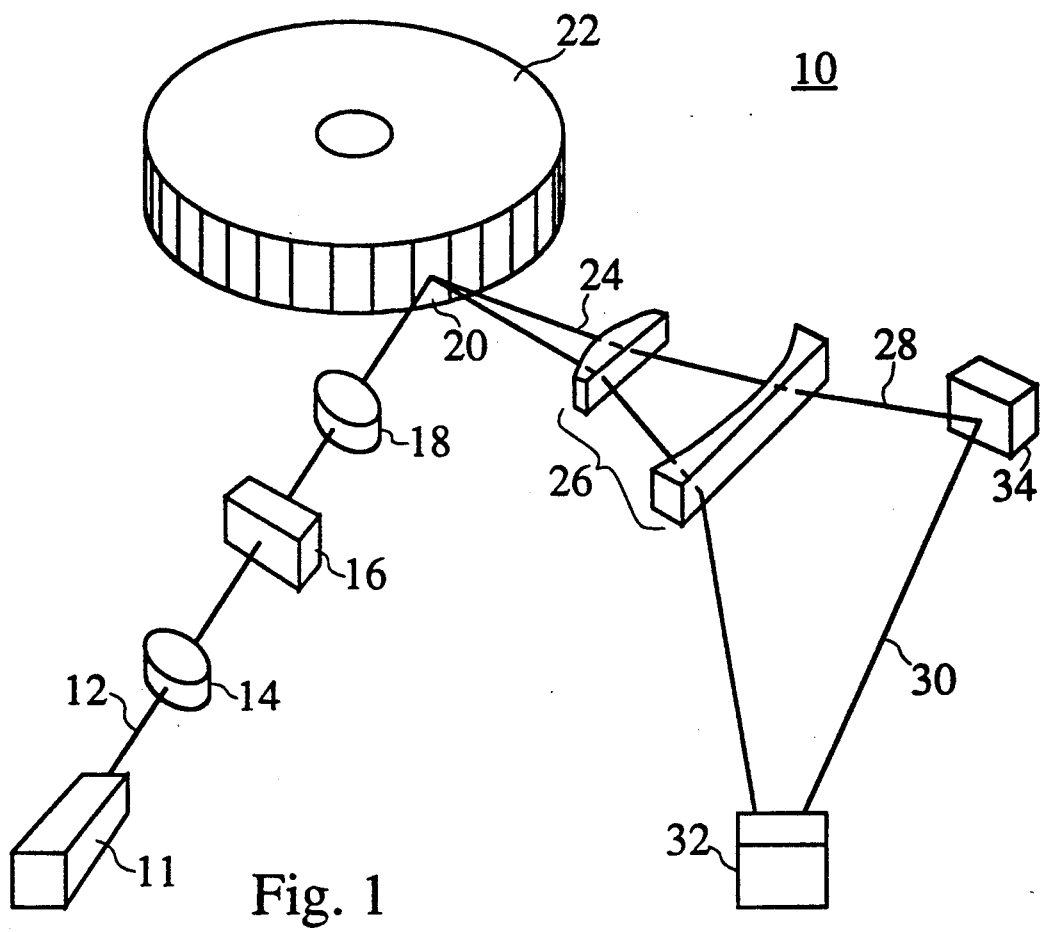
FIG. 1 is a mechanical schematic of a generic raster output scanner (ROS).

FIG. 1 is a generic schematic of a raster output scanner (ROS) 10. Laser 11 directs optical beam 12 into first lens 14, acousto-optical modulator (AOM) 16 and second lens 18. The beam 12 is then directed onto mirror facet 20 affixed to rotating mirror wheel 22. The rotation of mirror wheel 22 causes scanned input beam 24 to scan across asymmetric lens pair 26. Scanned output beam 28 emerges from asymmetric lens pair 26 and scans across photoreceptor 30. The beginning of the scan is sensed by start scan detector 32 and the end of the scan is sensed by end of scan detector 34.

Figure 2A:
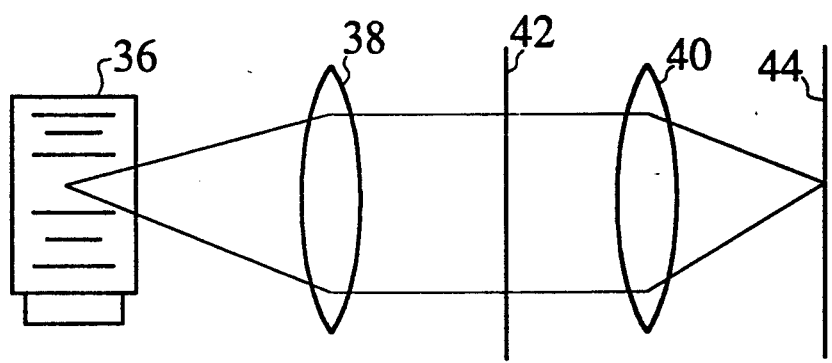
FIGS. 2a-2b show the difference between a conventional FSS ROS and the Scophony ROS.
Figure 2B:
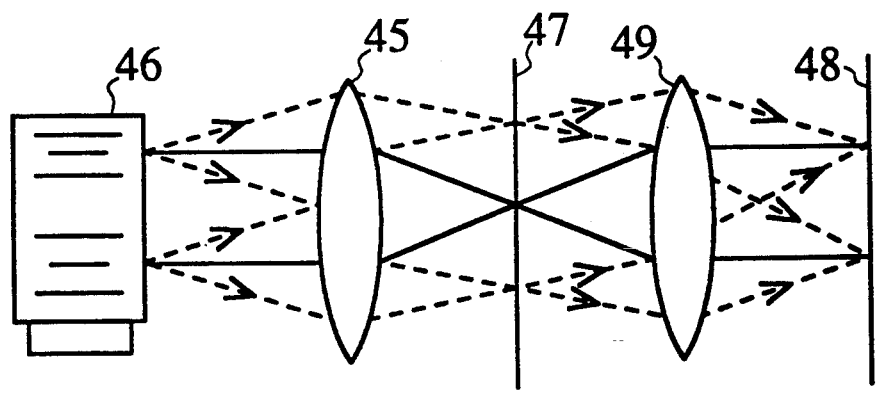

FIGS. 2a and 2b illustrate the difference between the conventional FSS ROS and the Scophony ROS. FIG. 2a shows how, in a conventional FSS ROS, the diverging beam from AOM 36 is collimated at facet 42 by collimating lens 38, corresponding to lens 18 of FIG. 1. The collimated beam is reflected from facet 42 and focussed at image plane 44 by lens 40, corresponding to asymmetric lens pair 26 of FIG. 1.

FIG. 2b shows how, in a Scophony ROS, the collimated beam from AOM 46 is converged to a narrow "waist" at the facet 47 by lens 45, corresponding to lens 18 of FIG. 1. These rays as shown as solid lines in FIG. 2b. When the acoustic pulses in AOM 46 occur rapidly, the light is diffracted by these acoustic pulses. This diffracted light, shown as dotted lines in FIG. 2b, is also converged to "waists" at facet 47 by collimating lens 45. The dotted lines in FIG. 2b show how the beams diverging from the waists at facet 47 are brought to convergence in an overlapping manner at the image plane 48 by lens 49, corresponding to asymmetric lens pair 26 of FIG. 1. The interference pattern of the overlapping beams reconstructs an image of the acoustic pulses. In FIGS. 2a and 2b, image planes 44 and 48 are coincident with photoreceptor 30 of FIG. 1.

The Scophony ROS of FIG. 2b differs from the conventional FSS ROS of FIG. 2a in that the FSS ROS uses the acoustic pulses in AOM 36 as a "shutter" which rapidly turns the laser beam on and off, whereas the Scophony ROS images the acoustic pulses in AOM 46 onto the photoreceptor. This why the Scophony scanner technique is often referred to as "pulse imaging".

Figure 3A:
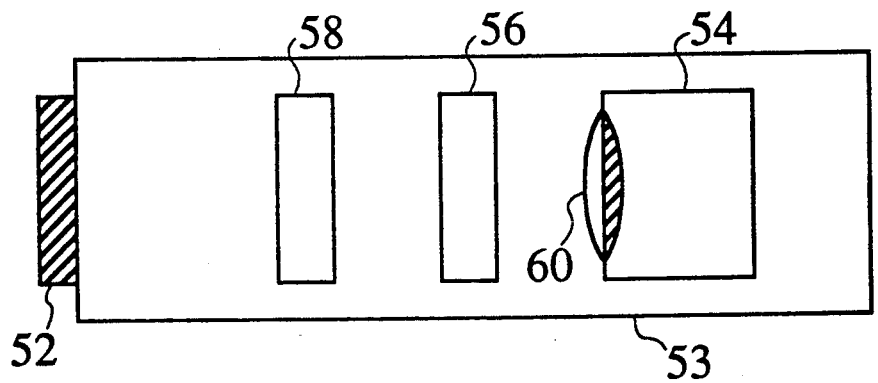
FIGS. 3a-3b show the difference in the shape of the optical beam across the acousto-optic modulator (AOM) when illuminated by the conventional FSS beam, as in FIG. 3a; and when illuminated by the Scophony scanner's beam, as in FIG. 3b.
Figure 3B:
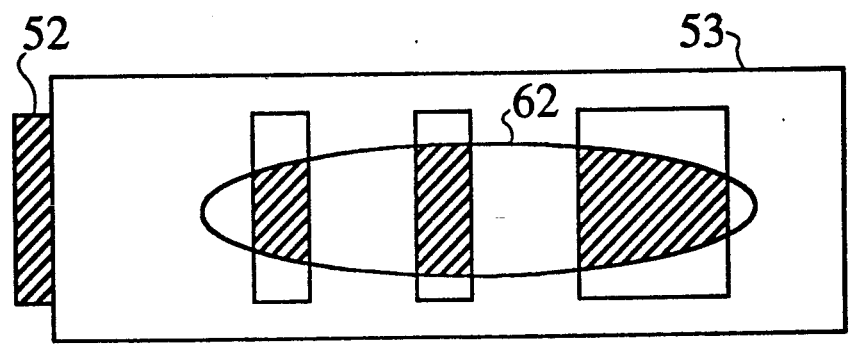

FIGS. 3a and 3b show details of the difference between the conventional FSS ROS and the Scophony ROS. In both FIGS. 3a and 3b acoustic transducer 50 produces signal pulses in AOM 52. These signal pulses travel from left to right in FIGS. 3a and 3b. A first pulse 54 is followed by a second pulse 56, and a third pulse 58. In the conventional FSS ROS of FIG. 3a, the modulated optical beam 60 is smaller longitudinally than the smallest pulses in the AOM 56, 58. However, in the Scophony ROS of FIG. 3b, the modulated optical beam 62 is larger longitudinally than the total longitudinal dimension covered by all three pulses 54, 56, and 58.

In order for the image to appear stationary on the photoreceptor, the following relationship must hold:

$$V_{scan} + M \cdot V_{sound} = 0 \tag{1}$$

where
$V_{scan}$ is beam velocity at the photoreceptor,
M is scanner optics magnification, and
$V_{sound}$ is velocity of sound in the AOM.

Because $V_{scan}$ and $V_{sound}$ are both vector quantities, $V_{sound}$ must be properly phased relative to $V_{scan}$ so as to provide a stationary image of the acoustic pulses at the photoreceptor.

FIG. 4 shows how the combination of FIG. 1's moving mirror facet 20 and the motion of the pulse pair 64 cancel one another, to produce a stationary image of the pulse pair 64 at the photoreceptor. When mirror facet 20 is not moving, the pulse pair 64 is initially imaged as pulse pair 68 on the photoreceptor image plane 48, as shown in FIG. 4b. At a slightly later time, the moving pulse pair 70 is imaged as pulse pair 72 on the photoreceptor 48; and at a still later time, the moving pulse pair 74 is imaged as pulse pair 76. Note that throughout this sequence, the image of the laser beam 68 does not move relative to photoreceptor 48, but the successive images of the moving pulse pairs in the AOM 64,70,74 do move relative to photoreceptor 48. Thus, the moving images will appear as a blur on photoreceptor 48.

When mirror facet 20 is moving at the speed indicated in equation 1, as shown in FIG. 4c, pulse pair 64 is imaged as pulse pair 78 on photoreceptor image plane 40. At a later time, pulse pair 70 is imaged as pulse pair 80, and, still later, pulse pair 74 is imaged as pulse pair 82. It can be seen that the moving facet 20 causes each of the pulse images 78, 80, 82 formed on photoreceptor 48 to appear static relative to the photoreceptor 48. The image of optical beam 66 moves during this time. Thus rotation of the scanning mirror 22 results in a static, non-blurred image on photoreceptor 48.

Figure 5A:
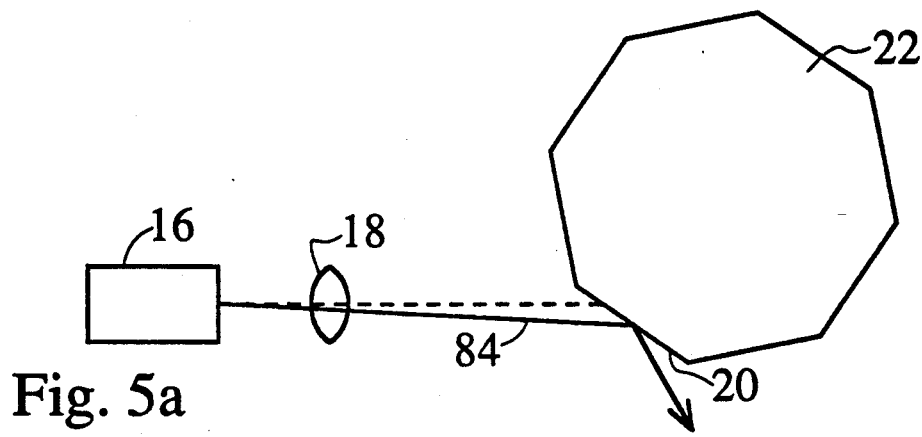
FIGS. 5a-5b show how the mirror facet translates laterally as the mirrored wheel rotates, requiring "facet tracking" of the optical beam.
Figure 5B:
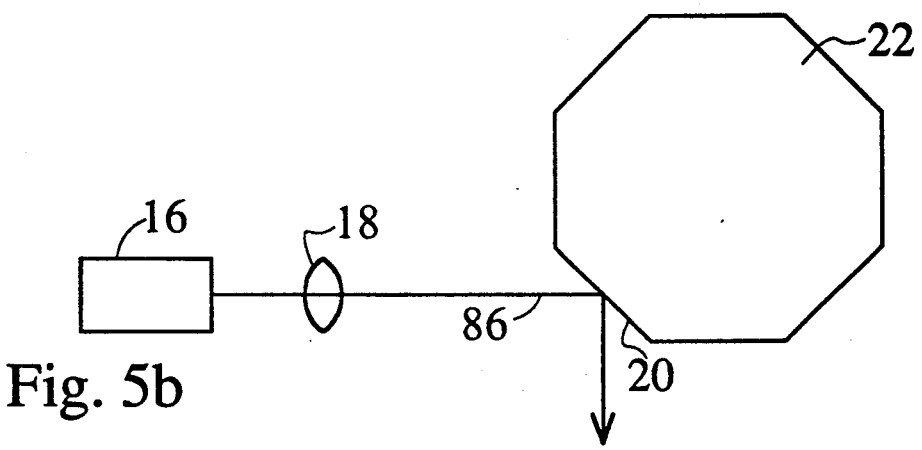
Figure 5C:
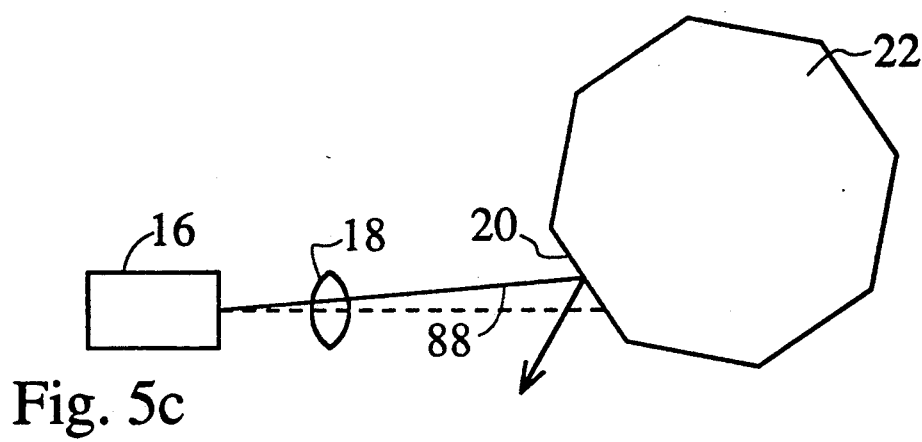

A complication results from the motion of the scanning mirror facets. As shown in FIG. 5, when mirror 22 rotates, the illuminated facet 20 undergoes translation, as well as rotation, relative to the optical beam. When high performance is desired, the rotating mirror will be designed so that facet 20 will be just large enough to accommodate the maximum beam width, which calls for "facet tracking" as shown in FIG. 5. I.e. The center of the beam 84 is seen to be pointed below the horizontal in FIG. 5a. At a later time, beam 86 is pointed horizontally in FIG. 5b, and, at a still later time, beam 88 is pointed above the horizontal in FIG. 5c. As mirror 22 rotates, the beam 84, 86, 88 is continually deflected by AOM 16 in order to keep it centered on the facet 20.

In order to accomplish facet tracking the AOM is used in the Bragg diffraction mode, where the angle of diffraction produced by the AOM is a function of the acoustic and optical wavelengths. The beam is "steered" by sweeping the RF carrier through the appropriate frequency range in synchronism with the facet motion. At the end of the scan, the carrier frequency snaps back the starting frequency, so that the beam will rapidly switch to the next facet.

FIG. 6 illustrates how the beam is broadened by diffraction, as previously shown in FIG. 2b. When the RF carrier is modulated by the input video, upper and lower sideband frequencies are generated, with a lower sideband at a frequency equal to carrier frequency minus the modulating frequency, and an upper sideband at a frequency equal to carrier frequency plus the modulating frequency.

Figure 6A:
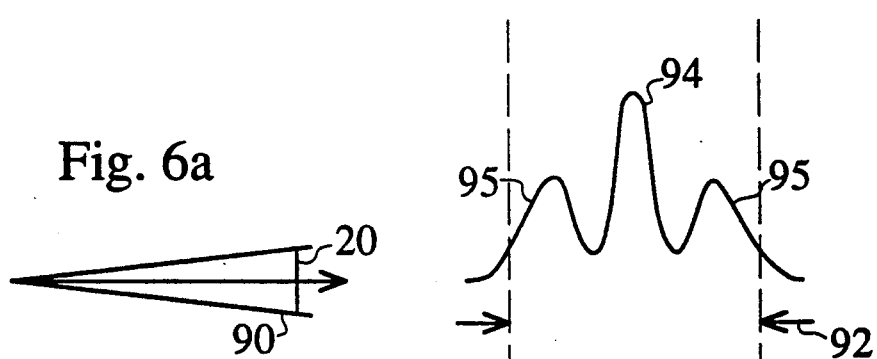
FIG. 6 shows how the mirror facet acts as a band-limiting filter in relation to double sideband modulation and vestigial sideband modulation.
Figure 6B:
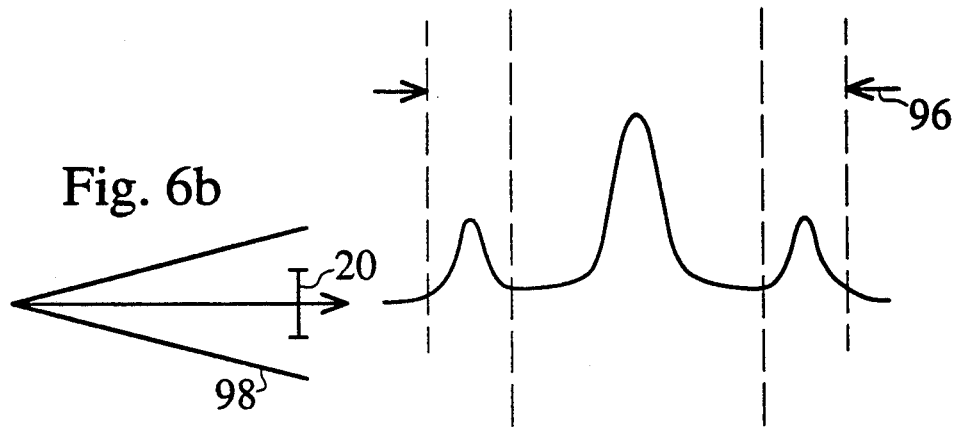
Figure 6C:
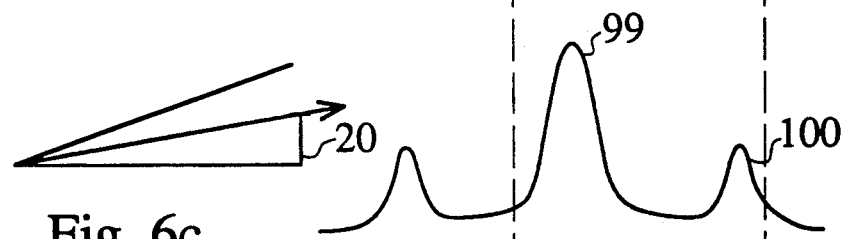

FIGS. 6a through 6c illustrate the diffraction of the beam from the AOM to the facet, and the beam profile as it appears at the facet, when the RF carrier is 100% DSB amplitude modulated by a single video frequency. FIGS. 6a through 6c show the central beam 94 and two side beams 95. The central beam is light diffracted by the carrier frequency; the two side beams are light diffracted by the upper and lower sidebands. FIG. 6a shows a case where the entire beam profile 90 at facet 20 consists of a central carrier beam 94 and two side-beams 95. The facet 20 is large enough that all the beam energy is contained within the bounds of facet 20. The interference of the three beams (94,95) at the image plane will create a sinusoidal amplitude pattern corresponding to the input signal. The sinusoidal amplitude pattern corresponds to a sine squared intensity pattern.

FIG. 6b illustrates how the diffraction angle 98 increases when the video input frequency increases. The sidebands are shown as diffracting outside the bounds of facet 20. An increase of facet 20 size would be required to allow passage of these sidebands. The facet 20 therefore acts as a bandpass filter, removing some of the high frequencies from the optical beam 98.

FIG. 6c shows how the central carrier beam 99 can be offset with respect to the facet 20 to regain the information lost in FIG. 6b, by bringing one sideband 100 on to the facet. Since each sideband carries all the information available in the video input signal, it is not necessary to pass both sidebands. However, when the beam is offset as shown in FIG. 6c, all the energy in the other sideband is lost, and the central beam has more energy than needed.

Figure 6D:
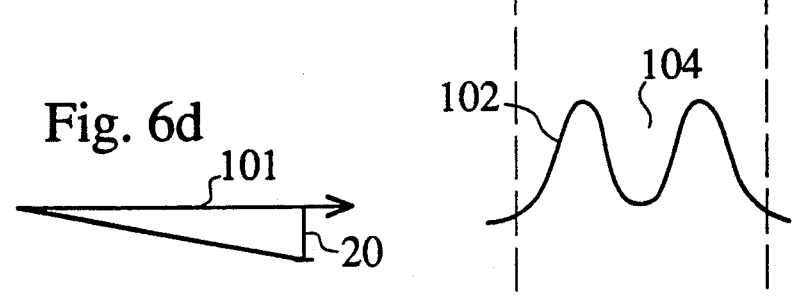

FIG. 6d illustrates a similar condition, using vestigial sideband modulation. The beam 101 energy distribution corresponds to 100% vestigial sideband modulation of a single sinusoidal video frequency. At the image plane, the interference of the central beam and the single side beam will create a sinusoidal intensity pattern 104, corresponding to the input signal. All the information is preserved in the modulated optical beam 101, 104.

In summary, there are several disadvantages to using DSB modulation of the optical beam:
(1) As shown above, increasing information bandwidth requires larger mirror facets, which in turn increases the required frequency shift still further.
(2) The amplitude modulated beam impinges on a photoreceptor which follows a square law, thus resulting in image intensity distortion.
(3) The depth of field is reduced because the phase shift of the two sidebands and carrier reduces the image contrast.

All these disadvantages can be overcome or reduced by using vestigial sideband modulation, as shown in FIG. 6d. Vestigial sideband modulation produces a beam 101, 104, in which one sideband is reduced to zero, and the carrier frequency 102, is reduced to half its original amplitude. The mirror facet 20 passes a beam 101 which is of the same physical beamwidth as beam 90 in FIG. 6a, but the information content is twice as great as that carried by DSB modulated signal 94 of FIG. 6a. All the original video information is available in the vestigial sideband signal 101, 104, and the information can be completely reconstructed at the receiver.

In practice, vestigial sideband modulation is the most appropriate form of modulation to use. It is a form of single sideband modulation in which the carrier's relative amplitude is reduced to half of its original amplitude. Vestigial sideband can reduce the bandwidth to approximately one-half the bandwidth required by conventional DSB AM. This narrower bandwidth manifests itself both as a narrower electrical signal, and as a physically narrower optical beam. Use of vestigial sideband modulation is the essence of the Scophony modulation technique. Vestigial sideband modulation also overcomes the other disadvantages of DSB AM:
(1) Vestigial sideband can pass higher information frequencies for a given facet size.
(2) Vestigial sideband modulation produces a signal which is compatible with the square law detection of photodetectors, resulting in linear detection.
(3) The contrast of the resulting image is unaffected by the phase shift of the carrier and one sideband.

High performance requires matching the size of the optical beam to the size of the facet, and tracking the translation of the mirror facets, so as to keep the optical beam from being truncated by the translation. Facet tracking is achieved by imparting a frequency shift to the carrier, resulting in beam steering of the optical beam.

Figure 7:
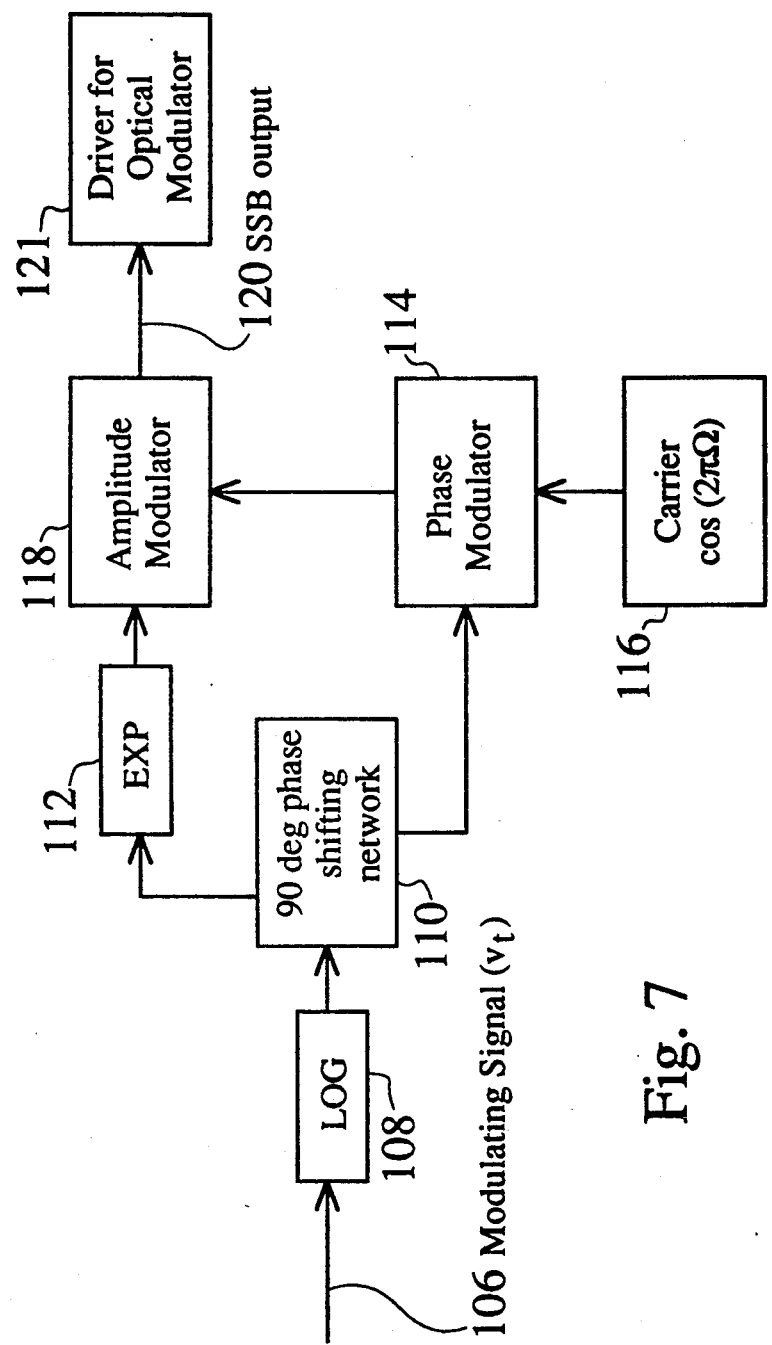
FIG. 7 is a block diagram of the Powers vestigial sideband modulator.

In principle, the desired vestigial sideband modulation could be achieved by use of a Powers circuit, such as that shown in FIG. 7. The Powers modulation and drive circuit is described in Powers, K. H., Proc. IRE 48, 1431 (1960), and in Von Urff et al, IRE Trans Comm. Systems CS-10 257 (1962), and it is shown schematically in FIG. 7. The modulating signal 106 is passed through a non-linear logarithmic circuit 108. The log of the modulating signal then goes to a 90 degree phase shifting network 110. The output of the 90 degree phase shifting network goes to a non-linear exponentiation circuit 112, and to a phase modulator 114. The phase modulator 114 modulates the signal information onto a carrier 116. The output of phase modulator 114 is fed into an amplitude modulator 118, where it is further modulated by the signal from the exponentiation circuit 112. The resulting output of the amplitude modulator 118 is the single sideband (SSB) signal 120 to the optical modulator 121. The Powers circuit of FIG. 7 requires non-linear logarithmic 108 and exponential 112 functions, a linear Hilbert Transform network, phase and amplitude modulators, and is thus a relatively complex circuit. The requirement for facet tracking, by sweeping the carrier frequency, further complicates the design of the Powers circuit, which is therefore considered to be too complex to be practical.

Figure 8A:
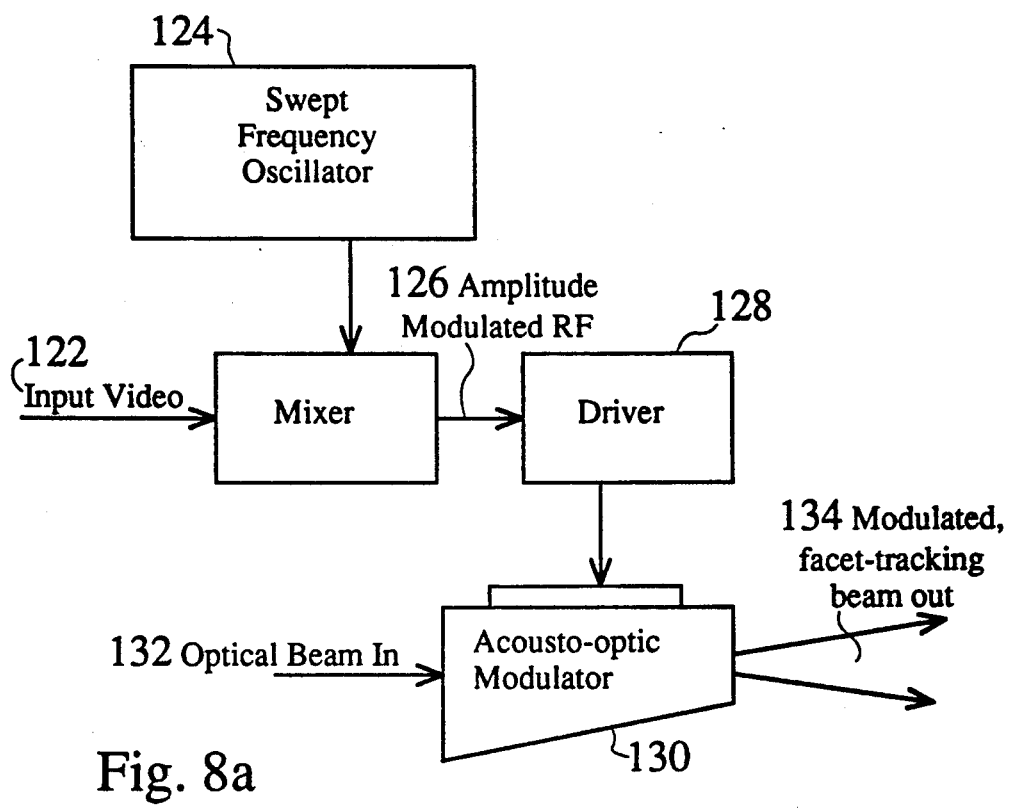
FIG. 8a is a block diagram of a Powers modulator.

FIG. 8a is a block diagram of the prior art—a double sideband amplitude modulator (DSB-AM). Input video 122 is mixed with the output of swept frequency RF oscillator 124 to produce amplitude modulated RF 126. Amplitude modulated RF 126 is fed into driver 128, which in turn drives acousto-optic modulator 130. Acousto optic modulator 130 accepts optical beam 132 and outputs a modulated, facet tracking beam 134.

Figure 8B:
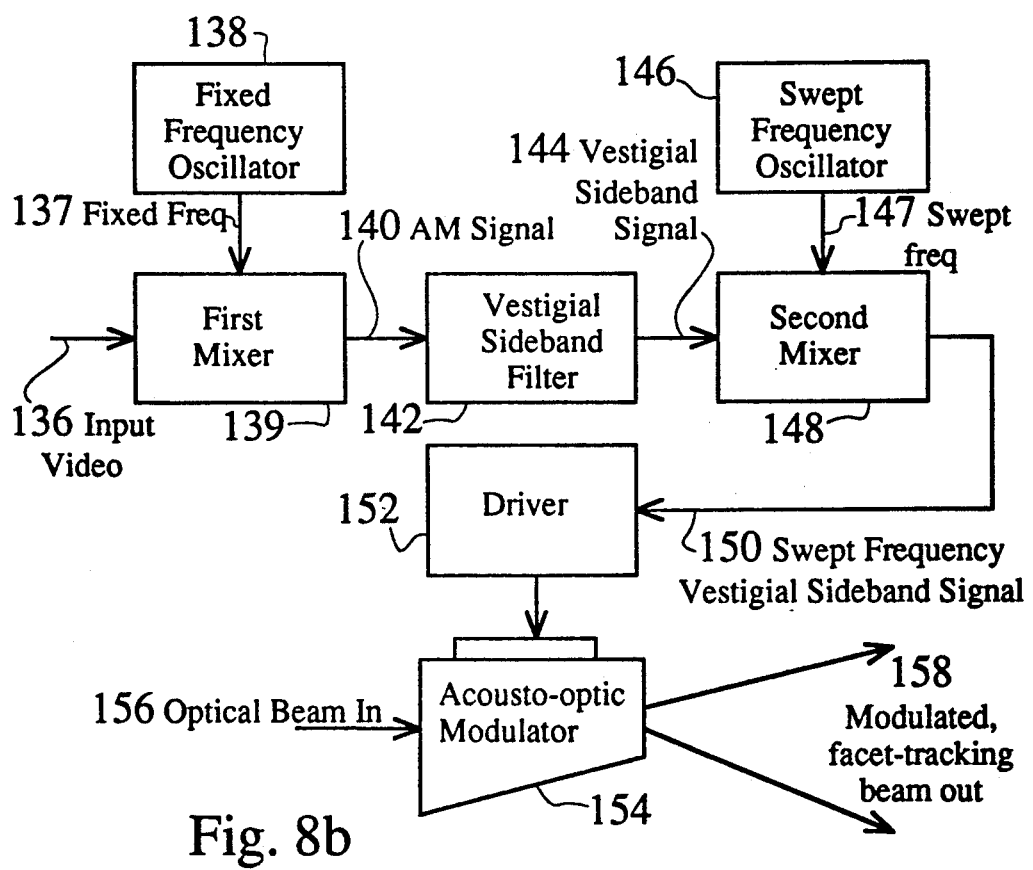
FIG. 8b is a block diagram of the Improved Optical Modulator which is the basis of the present invention.

The preferred embodiment of the present invention is the Improved Optical Modulator shown in FIG. 8b. It uses relatively simple circuitry to take full advantage of the performance improvement of vestigial sideband modulation and facet tracking.

The Improved Optical Modulator steers the beam so as to precisely track the illuminated facet. It employs electronic optical beam steering which shifts beam direction by varying the frequency of the optical sideband which is retained in vestigial sideband modulation. By suitable shifting the modulating RF frequency, the beam is continually shifted by just the right amount to track the illuminated facet.

The Improved Optical Modulator first mixes the input video 136 with a fixed frequency RF 137 from a fixed frequency oscillator 138 in a first mixer 139. The resulting Amplitude Modulated RF 140 is then passed through a vestigial sideband filter 142. The resulting vestigial sideband signal 144 is then mixed with a swept frequency RF 147 from a swept frequency oscillator 146 in a second mixer 148. The result is a vestigial sideband signal 150 whose RF is swept in frequency. This swept frequency RF 150 drives a driver 152 which modulates the Acousto Optic Modulator (AOM) 154. The AOM modulates optical beam 156 and outputs the modulated, facet-tracking optical beam 158 to the rotating mirror.

Although the present invention has been described in detail with reference to a particular preferred embodiment, persons possessing ordinary skill in the art to which this invention pertains will appreciate that various modifications and enhancements may be made without departing from the spirit and scope of the claims that follow.

LIST OF REFERENCE NUMERALS

Figure 1
- 10 Generic flying spot scanner (FSS)
- 11 Laser
- 12 Optical beam
- 14 First lens
- 16 Acousto-optic modulator (AOM)
- 18 Second lens
- 20 Mirror facet
- 22 Rotating mirror wheel
- 24 Scanned input beam
- 26 Asymmetric lens pair
- 28 Scanned output beam
- 30 Photoreceptor
- 32 Start scan detector
- 34 End scan detector Figure 2
- 36 Acoustoc-optic modulator (AOM)
- 38 First objective lens
- 40 Second objective lens
- 42 Mirror facet
- 44 Image plane
- 45 First lens
- 46 AOM (Scophony R#S)
- 47 Mirror facet
- 48 Image plane (Scophony R#S)
- 49 Second Lens Figure 3
- 52 Acoustic transducer
- 53 AOM
- 54 First pulse
- 56 Second pulse
- 58 Third pulse
- 60 Optical beam (conventional ROS)
- 62 Optical beam (Scophony ROS)

Figure 4
- 64 Acoustic pulse pair in AOM
- 66 Optical beam
- 68 Imaged pulse pair
- 70 Pulse pair in AOM at later time
- 72 Imaged pulse pair, later time
- 74 Pulse pair in AOM, still later time
- 76 Imaged pulse pair, still later time
- 78 Imaged pulse pair, stabilized
- 80 Imaged pulse pair, stabilized, later time
- 82 Imaged pulse pair, stabilized, still later time Figure 5
- 84 Scanned beam, below horizonal
- 86 Scanned beam, horizontal
- 88 Scanned beam, above horizontal Figure 6
- 90 Optical beam, DSB modulated
- 92 Electrical bandwidth of DSB signal
- 94 Carrier frequency of DSB signal
- 95 Side bands of DSB signal
- 96 Beamwidth requirement for increased video bandwidth
- 98 DSB modulated beam which is larger than facet
- 99 DSB modulated central beam which is displaced
- 100 DSB sideband which is displaced onto facet
- 101 Vestigial sideband modulated beam
- 102 Central carrier, vestigial sideband signal
- 104 Vestigial sideband signal Figure 7
- 106 Modulating signal
- 108 Logarithmic function
- 110 90 degree phase shifting network
- 112 Exponentiation function
- 114 Phase modulator
- 116 Carrier to be modulated
- 118 Amplitude modulator
- 120 Single sideband output
- 121 Driver for optical modulator Figure 8
- 122 Input video
- 124 Swept frequency oscillator
- 126 Amplitude modulated RF
- 128 Driver
- 130 Acousto-optic Modulator
- 132 Optical beam in
- 134 Modulated, facet-tracking beam out -continued

LIST OF REFERENCE NUMERALS

136 Input video
137 Fixed frequency
138 Fixed frequency oscillator
139 First mixer
140 Amplitude modulated signal
142 Vestigial sideband filter
144 Vestigial sideband signal
146 Swept frequency oscillator
147 Swept frequency
148 Second mixer
150 Swept frequency vestigial sideband signal
152 Driver
154 Acousto-optic modulator
156 Optical carrier into modulator
158 Modulated, facet tracking beam out of modulator

What is claimed is:

1. An apparatus for modulating a carrier signal, with a swept frequency vestigial sideband signal [150], comprising:
   a. a fixed frequency generating means [138] for producing a fixed frequency signal [137];
   b. a first mixing means [139] for mixing a video information signal [136] with said fixed frequency signal [137], to produce an AM modulated signal [140];
   c. a vestigial sideband filtering means [142] for producing a vestigial sideband signal [144] from said AM modulated signal [140];
   d. a swept frequency generating means [146] for producing a swept frequency signal [147];
   e. a second mixing means [148] for mixing said vestigial sideband signal [144] with said swept frequency signal [147], producing a swept frequency vestigial sideband signal [150];
   f. a modulator means [154] for modulating a final carrier frequency [156] with said swept frequency vestigial sideband signal [150], producing an output carrier [158] modulated by said swept frequency vestigial sideband signal [150]; and
   g. a driver means [152] for driving said modulator means [154] with said swept frequency vestigial sideband frequency [150].

2. An apparatus as in claim 1, in which said swept frequency means [146] operates at radio frequency (RF).

3. An apparatus as in claim 2, in which said final carrier frequency [156] is an optical frequency.

4. A modulator comprising:
   a. a first mixer (139) for modulating a video information signal (136) onto a fixed frequency radio frequency carrier (137), and producing an amplitude modulated radio frequency signal output (140);
   b. a vestigial sideband filter (142), for accepting said amplitude modulated radio frequency signal output (140) and producing a vestigial sideband radio frequency signal output (144);
   c. a second mixer (148), for mixing said vestigial sideband radio frequency signal output (144) with a swept frequency radio frequency signal (147), and producing a swept frequency vestigial sideband radio frequency signal output (150);
   d. a driver (152) for accepting said swept frequency vestigial sideband radio frequency signal output (150); and
   e. an acousto-optical modulator (154), for modulating an optical beam (156) in intensity and diffraction angle; said acousto-optical modulator (154) coupled to said driver (152) and responding to a swept frequency vestigial sideband radio frequency signal output of said driver (152) by internally propagating acoustic signal pulses at sonic velocity, said acoustic signal pulses modulating said optical beam (156) in accordance with frequency and amplitude content of said swept frequency vestigial sideband radio frequency signal (150).

5. A method for modulating a carrier signal, with a swept frequency vestigial sideband signal [150], comprising the steps of:
   a. mixing a video information signal [136] with a fixed frequency signal [137], in a first mixer [139], said fixed frequency signal [137] being generated by a fixed frequency oscillator [138], to produce an AM modulated signal [128];
   b. filtering said AM modulated signal [140], with a vestigial sideband filter [142] to produce a vestigial sideband signal [144];
   c. mixing said vestigial sideband signal [144] with a time-varying signal [147], in a second mixer [148], to produce a time-varying vestigial sideband signal [150];
   d. driving a driver [152] with said swept frequency vestigial sideband frequency [150];
   e. driving a modulator [154] with an output of said driver [152]; and
   f. modulating a carrier frequency [156] with said time-varying vestigial sideband signal [150], producing a time varying vestigial sideband modulation of said carrier [158].

6. A method as in claim 5, in which said swept frequency oscillator [146] is an RF oscillator.

7. A method as in claim 6, in which said carrier [156, 158] is at an optical frequency.

8. A modulator for use with a Scophony raster output scanner, comprising:
   a. a first mixer (139) for modulating a video information signal (136) onto a fixed frequency radio frequency carrier (137) and providing a modulated radio frequency carrier output (140);
   b. a vestigial sideband filter (142), for accepting said modulated radio frequency carrier output (140) and producing a vestigial sideband radio frequency signal output (144);
   c. a second mixer (148), for mixing said vestigial sideband radio frequency signal output (144) with a swept frequency radio frequency signal (147), and producing a swept frequency vestigial sideband radio frequency signal output (150),
      said swept frequency radio frequency signal (147) being swept over a frequency range such that said swept frequency radio frequency signal (147) tracks the angular position of a moving mirror facet (84);
   d. a driver (152) for accepting said swept frequency vestigial sideband radio frequency signal output (150) and producing a drive signal output; and
   e. an acousto-optical modulator (154), for modulating an incident optical beam (156) in intensity and diffraction angle and emitting a modulated, facet-tracking optical beam (158); said acousto-optical modulator (154) coupled to said driver (152) and responding to a swept frequency vestigial sideband radio frequency signal output of said driver (152) by internally propagating acoustic signal pulses at sonic velocity, said acoustic signal pulses modulating said optical beam (156) in accordance with frequency and amplitude content of said swept frequency vestigial sideband radio frequency signal (150).

* * * * *